United States Patent [19]

Johnson

[11] Patent Number: 5,363,214
[45] Date of Patent: Nov. 8, 1994

[54] FACSIMILE TRANSMISSION SYSTEM

[75] Inventor: Walter A. L. Johnson, Santa Clara, Calif.

[73] Assignee: Xerox Corporation, Stamford, Conn.

[21] Appl. No.: 814,514

[22] Filed: Dec. 30, 1991

Related U.S. Application Data

[60] Continuation-in-part of Ser. No. 738,716, Jul. 31, 1991, which is a division of Ser. No. 530,753, May 30, 1990, Pat. No. 5,060,980.

[51] Int. Cl.$^5$ ............................................. H04N 1/40
[52] U.S. Cl. ................................... 358/462; 358/464; 358/467; 358/470
[58] Field of Search ............... 358/403, 405, 434, 438, 358/448, 464, 467, 468, 470, 462, 440, 442, 400, 402, 404; 382/61, 48

[56] References Cited

U.S. PATENT DOCUMENTS

| 4,187,520 | 2/1980 | Beduchaud et al. | 358/257 |
| 4,922,348 | 5/1990 | Gillon | 358/407 |
| 4,933,979 | 6/1990 | Suzuki | 382/61 |
| 5,060,980 | 10/1991 | Johnson | 283/70 |
| 5,084,769 | 1/1992 | Miura | 355/403 |
| 5,258,855 | 11/1993 | Lech | 358/462 |
| 5,274,468 | 12/1993 | Ojha | 358/467 |

FOREIGN PATENT DOCUMENTS

| 0411231 | 2/1991 | European Pat. Off. | H04N 1/413 |
| 0459793 | 12/1991 | European Pat. Off. | G05K 19/08 |
| 4031195 | 4/1992 | Germany | H04N 1/138 |

OTHER PUBLICATIONS

Patent Abstracts of Japan, vol. 6, No. 77, 14 May 1982 & JP-A-57 015 566, 26 Jan. 1982 (Mitsubishi Denki KK).

Primary Examiner—Edward L. Coles, Sr.
Assistant Examiner—Jerome Grant, II
Attorney, Agent, or Firm—Kenyon & Kenyon

[57] ABSTRACT

Machine encoding of forms allows a simple recognition system to determine what marks on the form bear relevant information and, then to transmit only the relevant information, i.e. transmits bit maps representing the unique parts of the form and a description of the form itself but not a bit map of the entire form. Depending on the architecture of the system and the needs of the user, the original document may be processed at the reception site after only a small fraction of the document' contents has been transmitted. Transmission of bit mapped information is thus proportional only to the size and density of the bit map to be transmitted. Transmission of other types of information, e.g. checkboxes or ASCII coded data, is proportional to the number of such items, and not their size or density.

14 Claims, 4 Drawing Sheets

FACSIMILE TRANSMISSION SYSTEM

CROSS-REFERENCES TO RELATED APPLICATIONS

This is a continuation-in-part application of U.S. patent application Ser. No. 07/738,716 by Johnson et al. entitled "SYSTEM FOR PRODUCING A FORM UTILIZING ENCODED INDICATIONS FOR FORM FIELD PROCESSING" filed on Jul. 31, 1991, which is hereby incorporated by reference and which is a divisional application of U.S. application Ser. No 07/530,753 issued as U.S. Pat. No. 5,060,980 by Johnson et al. entitled "FORM UTILIZING ENCODED INDICATIONS FOR FORM FIELD PROCESSING" filed on May 30, 1990, which is also hereby incorporated by reference.

Another related application includes U.S. application Ser. No. 07/738,659 which is another divisional application of U.S. Pat. No. 5,060,980, "SYSTEM FOR READING A FORM UTILIZING ENCODED INDICATIONS FOR FORM FIELD PROCESSING" by Johnson et al. filed on Jul. 31, 1991, which is hereby incorporated by reference.

Additionally, this application is related to the application by Zdybel et al. entitled "HARDCOPY LOSSLESS DATA STORAGE AND COMMUNICATIONS FOR ELECTRONIC DOCUMENT PROCESSING SYSTEMS" filed on May 30, 1990, which is hereby incorporated by reference.

BACKGROUND OF THE INVENTION

The present invention relates generally to facsimile transmission systems, and more particularly to a facsimile transmission system that reduces the amount of transmission time required to transmit a document.

Transmission of documents via facsimile machines is common. Although standards exist for error correction and data compression, transmission times remain considerable for large documents and those with high printing density.

Many methods have been developed for reducing the transmission time of facsimiles, such as U.S. Pat. No. 4,922,348 which discloses a method for efficiently transmitting facsimile information using commercially available facsimile devices. This method permits the telephone network to recognize communication activity between two facsimiles and provides intermediate storage capability within the telephone network to increase the transmission efficiency. While promising to reduce transmission time this method, and data compression techniques based solely on the bit map representations of information present in a document to be transmitted can only reduce the transmission time to that required to transmit the information content represented by those bit maps. Thus, inherent limits exist which dictate the extent to which transmission time for a facsimile can be reduced without reducing the information content of the transmission.

Machine interpretable forms are a developing technology that provide a methodology for encoding important information about a document on the document itself. U.S. Pat. No. 4,933,979 discloses a form sheet reading apparatus that has a means for storing form information on form sheets and means for automatically discriminating a frame line of a form sheet, which is read and detected by comparing the detected frame line with frame line information within the form information stored in the storing means. Thus, data entered within predetermined regions of the form sheet are read under reading conditions determined by the form information stored in the storing means. This permits optimization of the efficiency of an optical character reader.

The present invention is directed to the problem of developing a method and apparatus for significantly reducing the transmission time of a facsimile device, without degrading the quality of the transmitted document

SUMMARY OF THE INVENTION

The present invention solves this problem by using a system of self-encoded forms that carry a description of the form on the form itself and then transmitting only the description of the form rather than the entire description of the form, as well as bit maps of the unique parts of the form. Thus, the document can be regenerated at the receiving end from the form description and its unique parts.

A first method of the present invention for transmitting a form to a regenerating device, which form has a generic part and a unique part, encodes a description of the generic part on the form itself. The transmitting device then scans the form to detect both the unique and generic parts. After the scanning step, the transmitting device creates a bit map of the unique part and a digital encoding of the description of generic part and transmits them over the communications link to the regenerating device. Finally, the regenerating device regenerates the form from the bit map and the digital encoding.

A second method of the present invention stores a description of the generic part in a memory location within the receiving device and encodes a pointer on the form, which pointer specifies the memory location within the receiving device in which the description of the generic part is stored. The transmitting device then scans the form to detect the pointer and the unique part and creates a bit map of the unique part and a digital encoding of the pointer. This bit map and pointer code is then transmitted over the communications link to the receiving device. The receiving device then retrieves the description of the generic part from the storage location specified by the pointer and regenerates the form from the bit map and the description.

A third method of the present invention, for transmitting a form to a standard facsimile, stores a description of the generic part in a memory location within the transmitting device and encodes a pointer on the form itself, which pointer specifies the memory location within the transmitting device in which the description of the generic part is stored. Next, the transmitting device scans the form to detect the pointer and the unique part and retrieves the description of the generic part from the storage location specified by the pointer. This eliminates the need to scan the generic part of the form, thus reducing the scanning time and hence the total transmission time. The transmitting device then creates a bit map of the unique and generic parts and transmits the bit map over the communications link to the standard facsimile. The standard facsimile then regenerates the form from the bit map.

An apparatus for implementing the first method of the present invention uses a scanner to scan the form for detecting the unique part and the description of the generic part. The scanner creates a bit map of the unique part and a digital encoding of the description of the generic part. A transmitter coupled to the scanner and to the communications link transmits the bit map and the digital encoding over the communications link to a receiver. The receiver receives the bit map and the digital encoding, from which a regenerating device, coupled to the receiver, regenerates the form.

An apparatus for implementing the second method of the present invention uses a scanner to scan the form for detecting the unique part and a pointer. The scanner creates a bit map of the unique part and a digital encoding of the pointer. A transmitter coupled to the scanner and also to the communications link transmits the bit map and the digital encoding over the communications link to a receiver. The receiver receives the bit map and the digital encoding, representing the pointer, which points to a memory location in a storage which stores a description of the generic part. A regenerating device coupled to the receiver and to the storage retrieves the description of the generic part from the memory location in the storage specified by the pointer and regenerates the form from the bit map and the description.

An apparatus which implements the third method of the present invention uses a storage on the transmitting side for storing a description of the generic part in a memory location specified by the pointer. A scanner is coupled to the storage and scans the form to detect the unique part and the pointer. The scanner retrieves the description of the generic part from the memory location specified by the pointer and creates a bit map of the entire form, i.e. the unique and generic parts. A transmitter coupled to the scanner and to the communications link transmits the bit map over the communications link to a receiver. The receiver receives the bit map and a regenerating device coupled to the receiver regenerates the form from the bit map.

One embodiment of this method uses a computer workstation to interpret and act upon these forms. Another possible embodiment of the present invention incorporates the software required to perform the recognition and processing of these forms into a single standard processor. The combination of these two embodiments enables two new classes of improved facsimile transmission and reception devices.

Machine encoding of forms allows a simple recognition system to determine what marks on the form bear relevant information and, then to transmit only the relevant information. Depending on the architecture of the system and the needs of the user, the original document may be processed at the reception site after only a small fraction of the document' contents has been transmitted. Transmission of bit mapped information is thus proportional only to the size and density of the bit map to be transmitted. Transmission of other types of information, e.g. checkboxes or ASCII coded data, is proportional to the number of such items, and not their size or density.

DETAILED DESCRIPTION

In the following discussion and the figures, the following terms will be used. New Fax refers to a facsimile device which contains both hardware and software to interpret, transmit and receive the form information of the present invention. Such information can be, e.g. the name or ID of the form, the name of checkboxes on the form that have been checked, the name of each alphanumeric field and the recognized ASCII text that each contains, or the name of any saved bit map region and the bit map it contains. Fax Server refers to a workstation that has the same capabilities as the New Fax. New Fax with storage refers to a New Fax that also has the capability of retaining descriptions of a variety of forms. Standard Fax refers to a conventional facsimile that traffics in the commonly employed transmission standards, such as CCITT G2, G3, G4 and ISDN, but has no capability for forms recognition, e.g. a Xerox 7021 telecopier which can send and decode touch-tones, ASCII, CCITI G2 and G3, and raw bit maps, but has no recognition capability. XG3 refers to the transmission of decoded form information by a FAX Server or a New Fax using any or all of the following-touch-tones, ASCII, CCITT G2, G3, G4, ISDN, and raw bit maps. Morph glyphs refer to digitally encoded data on paper represented by marks, such as bar codes. Parse refers to understanding a form's description via the morph glyphs.

Figure 1:
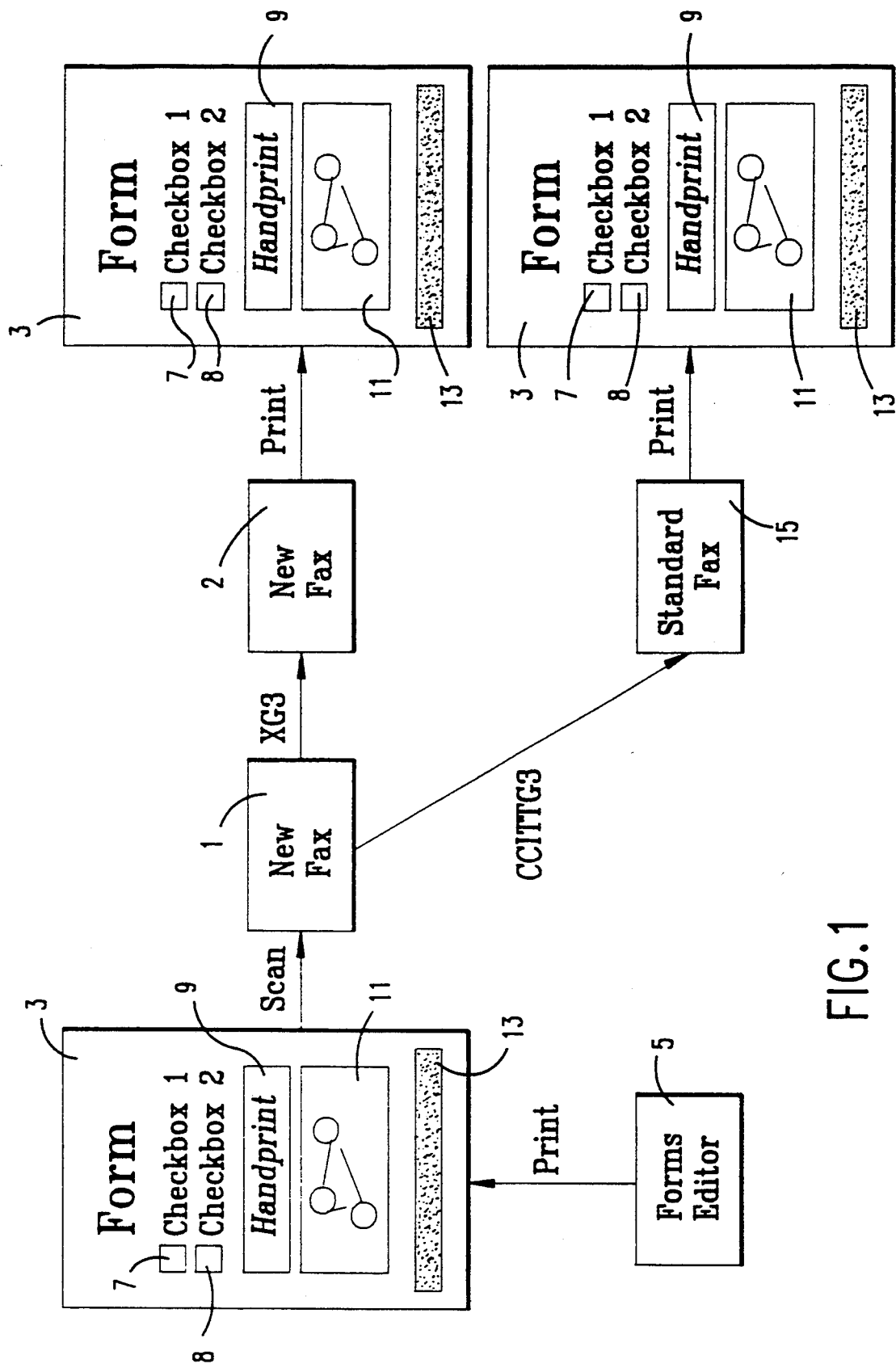
FIG. 1 depicts a block diagram of a system operating according to the present invention, showing transmission of self-encoded forms between a two facsimiles operating according to the present invention, and between a transmitting facsimile operating according to the present invention and a conventional facsimile, in which the forms carry a description of the form.

Referring to FIG. 1, two New Faxes 1 and 2, transmit a form 3 that has been created by a forms editor 5. The creation of the form by the forms editor 5 is discussed in the related applications, and need not be addressed here. The form 3 contains two check boxes 7 and 8, an alphanumeric region 9, a bit map 11, and an encoding of the form's description 13, as illustrated by the grey area. The encoding of the form's description is also discussed in the related applications and need not be addressed here, but could simply be a bar code, for example. The New Fax 1 scans the form 3 into its buffer (not shown), and passes the contents of its buffer 15 through the interpretive routines (not shown). The form's description 4 is then extracted from the shape encoded data 13, and used to parse the form 3. If the New Fax 1 transmits the form 3 to another New Fax 2, then the transmitting New Fax 1 sends a compressed ASCII encoding of the form 3 description, and the name value pairs for each field on the form 3 that has been marked. For example, if a saved region has bits blackened in its interior, the name of the field, and the compressed bit map of the region are transmitted. The receiving New Fax 2 reconstructs the original document 3 from the form description and the labelled bit maps 13. If the New Fax 1 transmits the form 3 to a Standard Fax 15, then the New Fax 1 ships the traditional CCITIG3 compressed raster of the entire page to the Standard Fax 15.

Figure 2A:
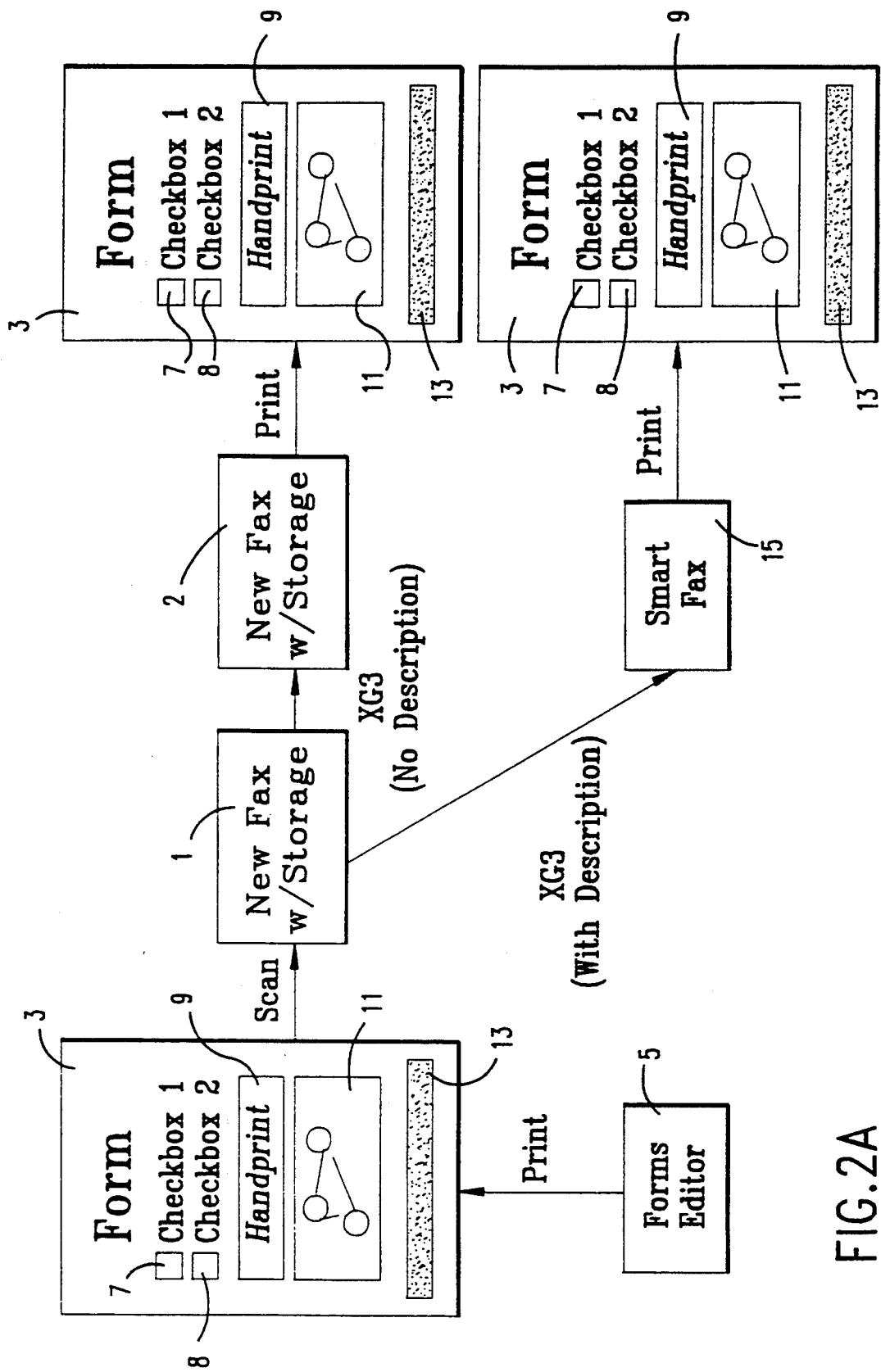
FIG. 2a depicts a block diagram similar to FIG. 1, having the additional capability of forms storage in the transmitting and receiving facsimiles in one case, and having forms storage only in the transmitting facsimiles in the other case, in which the forms carry a description of the form.
Figure 2B:
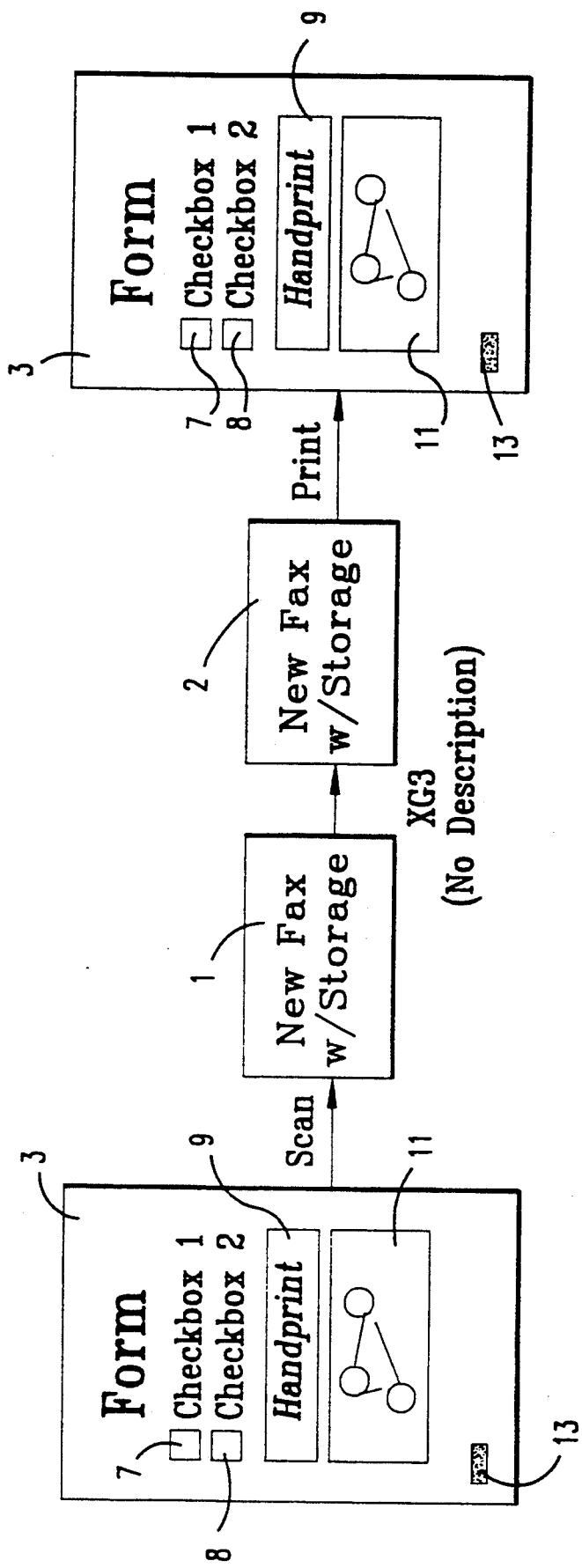
FIG. 2b depicts a block diagram similar to FIG. 1, having the additional capability of forms storage at the transmitting and receiving facsimiles, in which the forms carry a pointer to a memory location in which the description of the form is stored.

FIG. 2a presents an expanded scenario in which the transmitting New Fax 1 and the receiving New Fax 2 have the additional feature of Forms Storage. Previously loading the form description into New Faxes 1 and 2 enables the form description to be removed from the transmission. In this case all that must be transmitted is the forms's ID, and the relevant fields and their values. Notably, it is possible for the form itself to only contain the form ID, and not the entire form description, if it is known that both New Faxes 1 and 2 have the form registered. The forms could be programmed into the New Faxes, either locally or remotely, according to the parent application entitled "FORM AND SYSTEM UTILIZING ENCODED INDICATIONS FOR FORM FIELD PROCESSING." Additionally, since form descriptions are not necessarily memory intensive, the New Fax 1 or 2 could store the last n forms that it has processed. Obviously, n depends on the New Fax's memory size and the size of each individual form description. In this case, once a transaction had occurred as depicted in the top of FIG. 2a, successive transactions could be of the abbreviated sort as in FIG. 2b. It is important to note that only the generic Form Description must be saved to enable any future instance of that form to be used, i.e. only the description of the fields found on the form, not the overall looks of the form, which would include extraneous test and graphics. However, it should be noted that only a blank form could then be generated from this stored version at this point.

Figure 3:
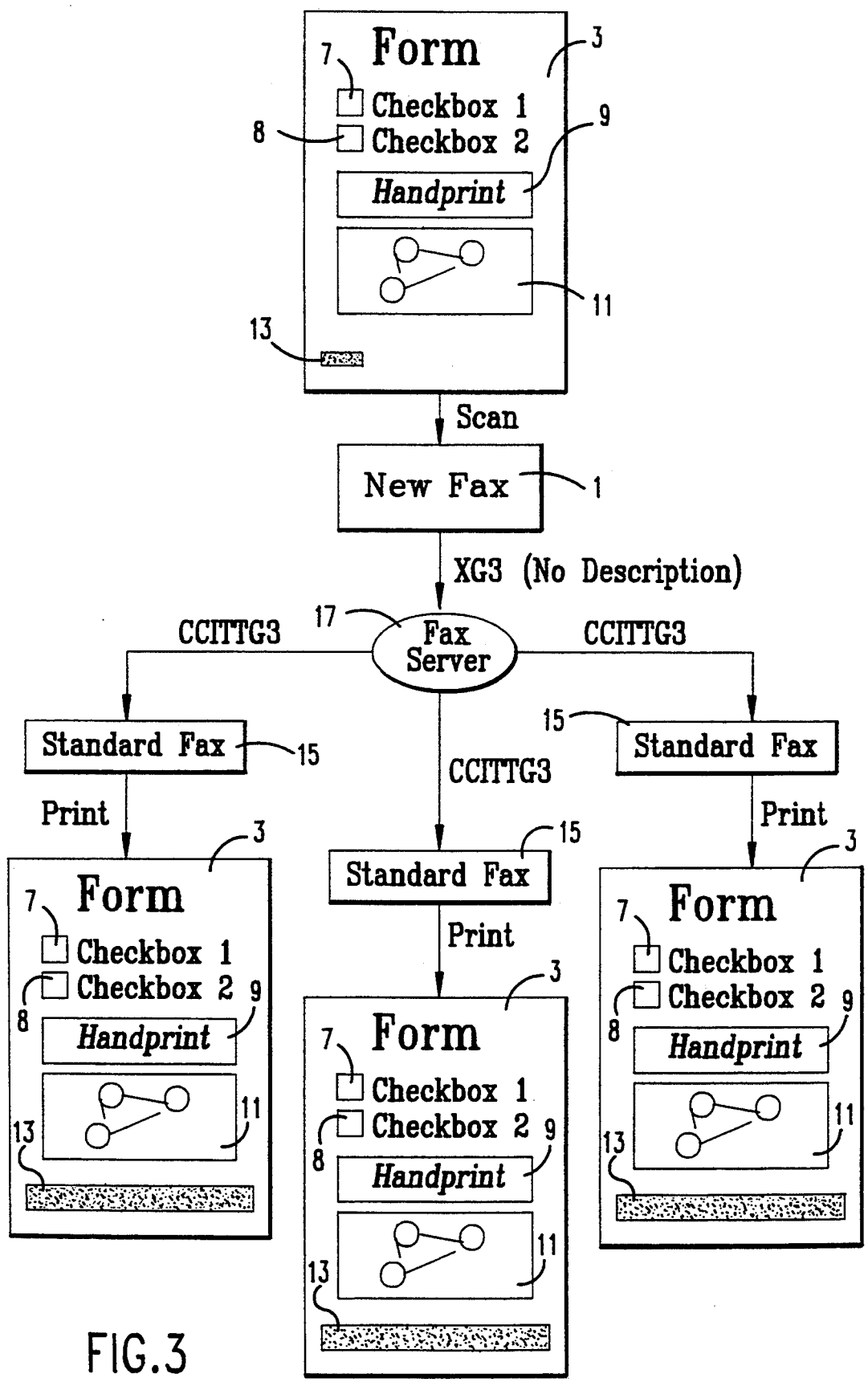
FIG. 3 illustrates the transmission of a document from a facsimile operating according to the present invention to remote facsimiles operating according to the present invention via a facsimile server, in which the forms carry only a pointer to a memory location in which the description of the form is stored.

FIG. 3 illustrates the transmission of a document from a New Fax 1 to a remote New Fax server 17. Registering all forms on a central Fax Server 17 would enable a remote New Fax 1 to send a very brief long distance transaction to the Fax server 17, which could disperse many fax transmissions to local standard faxes at inexpensive local telephone rates. Additionally, since a New Fax 1 need send only the result of the forms interpretation process to the Fax Server 17, the Fax Server 17 could begin processing the forthcoming document 3 (or spawn an application) immediately upon reception of the transmission, without a lag for form recognition. Bit map transmission could also be significantly reduced if character recognition on alphanumeric form fields took place before transmission, with only the resultant ASCII being transmitted.

In summary, by placing forms recognition capability within a fax machine, we can significantly reduce the cost of transmission of forms data, and increase the turn-around time for Fax Server application processing, since the recognition task would be distributed over a wide number of machines.

Other applications of the method of the present invention include transmitting between a computer that has a display terminal and a facsimile. In this case, the computer scans the screen of the display to create the bit maps of the unique parts of the form and to create the description of the generic parts of the form, thus enabling transmission to a New Fax, or to a standard fax by simply creating a bit map of the entire image.

What is claimed is:

1. A method for transmitting a form from a transmitting device to a receiving device, which form has a generic part and a unique part, comprising the steps of:
   a) storing a description of the generic part in a memory location within the receiving device;
   b) encoding a pointer on the form, said pointer specifying the memory location within the receiving device in which the description of the generic part is stored;
   c) scanning the form to detect the pointer and the unique part;
   d) creating a digital encoding of the pointer and a bit map of the unique part;
   e) transmitting the bit map and the digital encoding to the receiving device;
   f) retrieving the description of the generic part from the storage location specified by the pointer; and
   g) regenerating the form in the receiving device from the bit map and the description.

2. The method according to claim 1, further wherein said step of encoding further comprises encoding the form with shape encoded data.

3. The method according to claim 1, wherein said step of encoding further comprises encoding the form with bar codes.

4. The method according to claim 1, wherein said step of creating a digital encoding of the pointer comprises creating an ASCII coding of the pointer.

5. A method :for transmitting a form from a transmitting device to a receiving device, which form has a generic part and a unique part, comprising the steps of:
   a) storing a description of the generic part in a memory location within the transmitting device;
   b) encoding a pointer on the form, said pointer specifying the memory location within the transmitting device in which the description of the generic part is stored;
   c) scanning the form to detect the pointer and the unique part;
   d) retrieving the description of the generic part from the storage location specified by the pointer;
   e) creating a bit map of the unique and generic parts;
   f) transmitting the bit map to the receiving device; and
   g) regenerating the form in the receiving device from the bit: map.

6. The method according to claim 5, wherein said step of encoding further comprises encoding the form with shape encoded data.

7. The method according to claim 5, wherein said step of encoding further comprises encoding the form with bar codes.

8. An apparatus for transmitting a form over a communications link, which form has a generic part, a unique part and a pointer, comprising:
   a) a document processor scanning the form to detect the unique part and the pointer, wherein said document processor creates a bit map of the unique part and a digital encoding of the pointer;
   b) a transmitter being coupled to the document processor, being coupled to the communications link and transmitting the bit map and the digital encoding over the communications link;
   c) a receiver being coupled to the communications link and receiving the bit map and the digital encoding;
   d) a storage storing a description of the generic part in a memory location specified by the pointer; and
   e) a regenerating device being coupled to the receiver and to the storage, retrieving the description of the generic part from the memory location in the storage specified by the pointer and regenerating the form from the bit map and the description.

9. The apparatus according to claim 8, wherein said document processor and said transmitter comprise a facsimile device.

10. The apparatus according to claim 8, wherein said document processor further comprises a computer coupled to a display terminal.

11. An apparatus for transmitting a form over a communications link, which form has a generic part, a unique part and a pointer, comprising:
   a) a storage storing a description of the generic part in a memory location specified by the pointer; and
   b) a document processor being coupled to the storage and scanning the form to detect the unique part and the pointer, wherein said document processor retrieves the description of the generic part from the memory location specified by the pointer and creates a bit map of the unique part and generic parts;
   c) a transmitter being coupled to the document processor, being coupled to the communication link and transmitting the bit map over the communications link;
   c) a receiver being coupled to the communication link and receiving the bit map; and
   e) a regenerating device being coupled to the receiver and regenerating the form from the bit map.

12. The apparatus according to claim 11, wherein said document processor and said transmitter comprise a facsimile device.

13. The apparatus according to claim 11, wherein said document processor further comprises a computer coupled to a display terminal.

14. The apparatus according to claim 11, wherein said regenerating device and said receiver comprise a facsimile device.

* * * * *

UNITED STATES PATENT AND TRADEMARK OFFICE
CERTIFICATE OF CORRECTION

PATENT NO. : 5,363,214
DATED : November 8, 1994
INVENTOR(S) : Walter A.L. JOHNSON It is certified that error appears in the above-indentified patent and that said Letters Patent is hereby corrected as shown below:

| Column | Line | |
|---|---|---|
| 5 | 2 | Change "CCITI3 to —CCITTG3—. |
| 6 | 43 | Change "bit:" to --bit--. |
| 7 | 17 | (claim 11, line 6): After "storage" insert --,--. |
| 7 | 18 | (claim 11, line 7): Delete "and" (first occurrence). |
| 7 | 19 | (claim 11, line 8): After "pointer," insert --retrieving the description of the generic part from the memory location specified by the pointer,--; delete "wherein said document processor re-". |
| 7 | 20 | (claim 11, line 9): Delete entire line. |

UNITED STATES PATENT AND TRADEMARK OFFICE
CERTIFICATE OF CORRECTION

PATENT NO. : 5,363,214

DATED : November 8, 1994

INVENTOR(S) : Walter A.L. JOHNSON

It is certified that error appears in the above-indentified patent and that said Letters Patent is hereby corrected as shown below:

| Column | Line | |
|---|---|---|
| 8 | 1 | Delete entire line. |
| 8 | 2 | Delete "ates" and insert --and --creating--; after "map" change "of" to --from--; before "generic" insert --the description of the--; change "parts" to --part--. |
| 8 | 7 | Change "c)" to --d)--. |

Signed and Sealed this

Second Day of May, 1995

Attest:

BRUCE LEHMAN

Attesting Officer     Commissioner of Patents and Trademarks